Aug. 3, 1948.  C. W. CARLSON  2,446,359
METHOD OF PRODUCING GLASSWARE
Filed Feb. 5, 1947

INVENTOR
Charles W. Carlson
BY
Bean, Brooks, Buckley & Bean
ATTORNEYS

Patented Aug. 3, 1948

2,446,359

UNITED STATES PATENT OFFICE 2,446,359

METHOD OF PRODUCING GLASSWARE

Charles W. Carlson, Tiffin, Ohio

Application February 5, 1947, Serial No. 726,519

7 Claims. (Cl. 49—79)

1

This invention relates to glassware and particularly to a novel method of producing handmade glassware.

In the glassware art a sharp line of cleavage divides the hand-produced and the machine-produced glassware fields. So-called hand glassware is markedly superior in quality and general desirability. The problems and techniques of the two fields are distinct and generally separate. The present invention comprises a novel method in the art of producing glassware by hand fabrication. Because the glass is in a plastic or semi-solid state during certain stages of hand fabrication, the optical and chromatic effects produced by varying treatment are important and critical considerations.

The principles of the present invention will be illustrated herein by reference to specific articles of glass tableware, but it is to be understood that the scope of the present invention is not limited excepting as defined in the appended claims. By following the method of the present invention unique base or supporting formations may be formed upon a glass body with great facility and the resultant formations have novel optical properties.

In the accompanying drawing two distinct glassware supporting formations are illustrated by way of example, both produced by pursuing the same basic technique of the present invention. Various other designs and modifications of the resultant product may be made without departing from the underlying principles of the method of the present invention.

In the drawing:

Fig. 2 is another inverted perspective view of the tumbler of Fig. 1, but viewed at angle 45° removed horizontally from the angle at which Fig. 1 is viewed;

Figure 1:
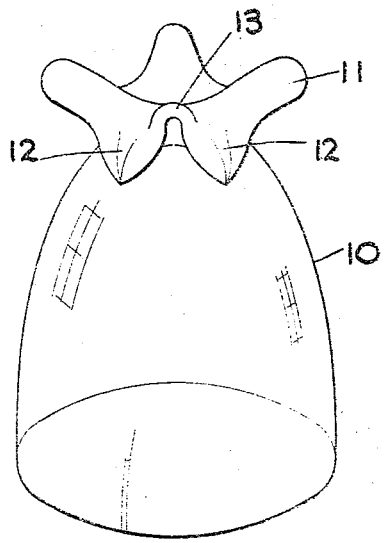
Fig. 1 is a perspective view of a tumbler bowl in an inverted position and having a supporting base formed thereon in accordance with the method of the present invention.
Figure 2:
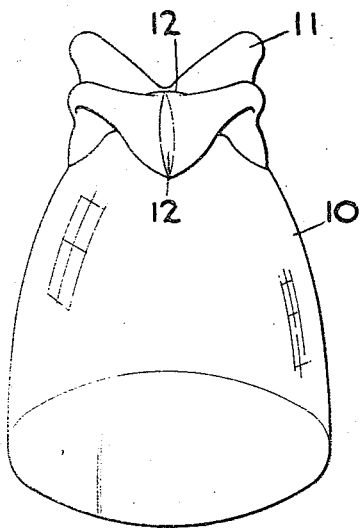

In Figs. 1 and 2, the numeral 10 designates a goblet bowl which is preferably hand-blown and in the illustrated instance is initially formed with a curved bottom requiring auxiliary means to permit its standing erect.

A base or foot for the bowl 10 is designated 11 and is formed in a manner which will now be described. After the bowl 10 has been blown and has cooled sufficiently to be self-sustaining, a gob of glass is deposited upon the inverted bowl in circular form and symmetrical concentric position, the gob being naturally somewhat flattened with respect to its vertical dimension. The operator then scores the gob almost through by drawing thereacross a straight edged instrument resembling a case knife or a pointed steel rod. Speaking broadly, the scoring is done on lines radiating from the center of the gob, or nearly the center, and preferably dividing the gob into equal sectors of any desired number. Referring specifically to the design of Figs. 1 and 2, the operator may score entirely across the gob diametrically on two lines at right angles to each other. The numeral 12 on Figs. 1 and 2 designate the remaining vestiges of the initial scored lines. The scoring, in the case of Figs. 1 and 2, produces four right angled segments and the glass of the gob fuses to the bottom of the bowl 10 along areas beneath the scored lines.

Upon such local fusion, the operator lifts the intermediate marginal edge portions of each sector of the gob beneath the scored lines by engaging a round ended rod of the general order of ⅛" in diameter beneath the edge of the gob of the glass and lifting this portion of the gob to any desired degree. In Fig. 1 the numeral 13 designates one such raised portion and the sector of the gob initially lying between the scored lines 12 is thus stretched to form a foot. This operation is repeated as to all four sectors to form the four pronged base illustrated in Figs. 1 and 2. Prior to final setting and after the four prongs are formed, the operator may invert the tumbler and press it gently upon a level surface to cause the extremities of all four prongs to lie in a common plane and thus insure that the tumbler will stand squarely. The rod referred to specifically here for lifting and stretching the edges of the gob is by way of example. Other forms of lifting implements may be employed to secure variations in the form of foot or prong being produced.

Figure 3:
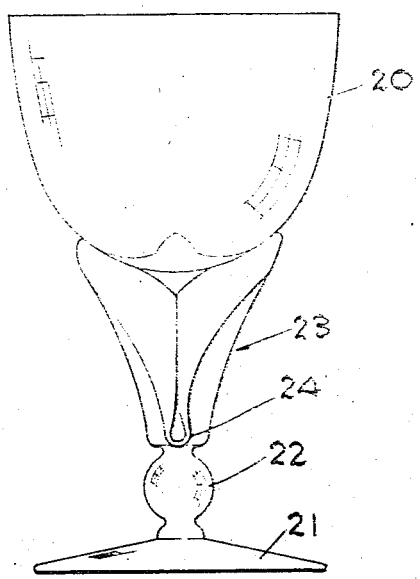
Fig. 3 is an elevational view of a goblet wherein the portion connecting the bowl with the base or foot is formed in accordance with the method of the present invention.
Figure 4:
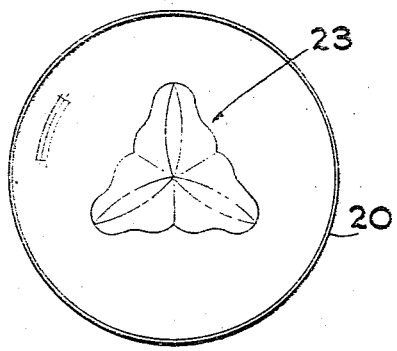
Fig. 4 is a top plan view of the goblet of Fig. 3.

In the case of the goblet illustrated in Figs. 3 and 4, the same basic procedure is followed to provide connecting means between a goblet bowl 20 and a foot 21. In the present instance the foot 21 has pre-formed thereon a spherical formation 22. In forming the specific connecting means designated generally 23 in Figs. 3 and 4, the operator divides the gob, after it is deposited upon the inverted bowl 20, into three or four equal sectors, whichever is desired, by scoring the gob from the center or near the center out along three equally spaced radial lines to cause the gob to adhere to the bowl 20 along those lines.

The operator then takes a rod-like tool, as in the case of Figs. 1 and 2, and lifts the intermediate edge portions of the three gob sectors away from the bell 20 to the point designated 24 in Fig. 3. In the case of Figs. 3 and 4 the three prongs thus formed are brought together centrally with respect to the axis of the bell during the lifting operation and their ends fuse to each other. While still plastic, the thus connected ends of the prongs are pressed against the top of the formation 22 of foot 21 and fuse thereto to form a complete goblet. It will be noted that the stretching of the sectoral portions of the gob in Figs. 3 and 4 is much more extreme than in Figs. 1 and 2, but the procedure is the same in theory and execution.

By way of example, illustrations have been set forth wherein three and four sectors are formed by the scoring, but the present method has been employed with only two 180° sectors produced by a single diametrical scoring and any greater number than four sectors may be produced as desired.

What is claimed is:

1. A method of producing glassware comprising depositing a gob of glass in a plastic state against the bottom of a pre-formed glass bowl, scoring said gob along radial lines to cause said gob to adhere to said bowl along such lines, and lifting the marginal portions of said gob between said lines from said bowl to produce a plurality of foot formations.

2. A method of producing glassware comprising depositing a gob of glass in a plastic state against the bottom of a pre-formed glass body, scoring said gob along radial lines to cause said gob to adhere to said body along such lines, and lifting the marginal portions of said gob between said lines from said body to produce a plurality of supporting formations.

3. A method of hand-fabricating glassware comprising depositing a gob of glass in a plastic state against the bottom of a pre-formed glass bowl, scoring said gob along radial lines with an edged tool to cause said gob to adhere to said bowl along such lines, and lifting the marginal portions of said gob between said lines from said bowl by engaging the end of an implement between the gob and the glass bowl to produce a plurality of foot formations.

4. A method of producing glassware comprising depositing a gob of glass in a plastic state against the bottom of a pre-formed glass bowl, scoring said gob along radial lines to cause said gob to adhere to said bowl along such lines, and lifting the marginal portions of said gob between said lines away from said bowl and toward the projected axis of said bowl whereby such portions are stretched to a point where they substantially meet and cooperate to form a stem for joining with a base element.

5. A method of producing goblets comprising depositing a gob of glass in a plastic state against the bottom of a pre-formed glass bowl, scoring said gob along radial lines to cause said gob to adhere to said bowl along such lines, lifting the marginal portions of said gob between said lines away from said bowl and toward the projected axis of said bowl whereby such portions are stretched to a point where they substantially meet and cooperate to form a stem, and pressing a foot against said meeting ends while they are still plastic to fuse said ends to the foot.

6. A method of hand fabricating goblets comprising depositing a gob of glass in a plastic state against the bottom of a pre-formed glass bowl, scoring said gob along radial lines with an edged tool to cause said gob to adhere to said bowl along such lines, and lifting the marginal portions of said gob between said lines by engaging the end of an implement between the gob and the glass bowl and drawing the marginal portion so engaged away from said bowl and toward the projected axis of said bowl whereby such portions are stretched to a point where they substantially meet and cooperate to form a stem for joining with a base element.

7. A method of producing glassware comprising depositing a gob of glass in a plastic state against the bottom of a pre-formed glass body, scoring said gob along radial lines to cause said gob to adhere to said body along such lines, and lifting the marginal portions of said gob between said lines away from said body and toward the projected axis of said body whereby such portions are stretched to a point where they substantially meet and cooperate to form an extension of said body.

CHARLES W. CARLSON.

REFERENCES CITED

The following references are of record in the file of this patent:

UNITED STATES PATENTS

| Number | Name | Date |
| --- | --- | --- |
| Re. 6,151 | Oesterling | Nov. 24, 1874 |
| 167,608 | Gill | Sept. 14, 1875 |
| 2,331,413 | Model | Oct. 12, 1943 |